United States Patent [19]

Andersen et al.

[11] 4,067,308
[45] Jan. 10, 1978

[54] SPIN EJECTOR

[75] Inventors: John A. Andersen; John J. Flanigan; Robert J. Kindley, all of Alburquerque, N. Mex.

[73] Assignee: The United States of America as represented by the United States Department of Energy, Washington, D.C.

[21] Appl. No.: 737,649

[22] Filed: Nov. 2, 1976

[51] Int. Cl.² .................................................. F41B 7/00
[52] U.S. Cl. ....................................... 124/16; 46/74 B
[58] Field of Search ................. 124/21, 17, 16, 29, 124/27, 26, 41 R, 37; 46/86 A, 86 B, 86 C, 86 R, 84, 82, 74 B; 273/26 D, 96 R, 26 R, 25

[56] References Cited
U.S. PATENT DOCUMENTS

| 2,043,677 | 6/1936 | Salomon | 124/27 UX |
| 2,474,054 | 6/1949 | Jones | 124/29 |
| 3,612,027 | 10/1971 | Makino | 124/37 X |
| 3,635,204 | 1/1972 | Plumb | 124/16 |

Primary Examiner—Richard C. Pinkham
Assistant Examiner—William R. Browne
Attorney, Agent, or Firm—Dean E. Carlson; Dudley W. King; Robert W. Weig

[57] ABSTRACT

The disclosure relates to an apparatus for spin ejecting a body having a flat plate base containing bosses. The apparatus has a base plate and a main ejection shaft extending perpendicularly from the base plate. A compressible cylindrical spring is disposed about the shaft. Bearings are located between the shaft and the spring. A housing containing a helical aperture releasably engages the base plate and surrounds the shaft bearings and the spring. A piston having an aperture follower disposed in the housing aperture is seated on the spring and is guided by the shaft and the aperture. The spring is compressed and when released causes the piston to spin eject the body.

4 Claims, 5 Drawing Figures

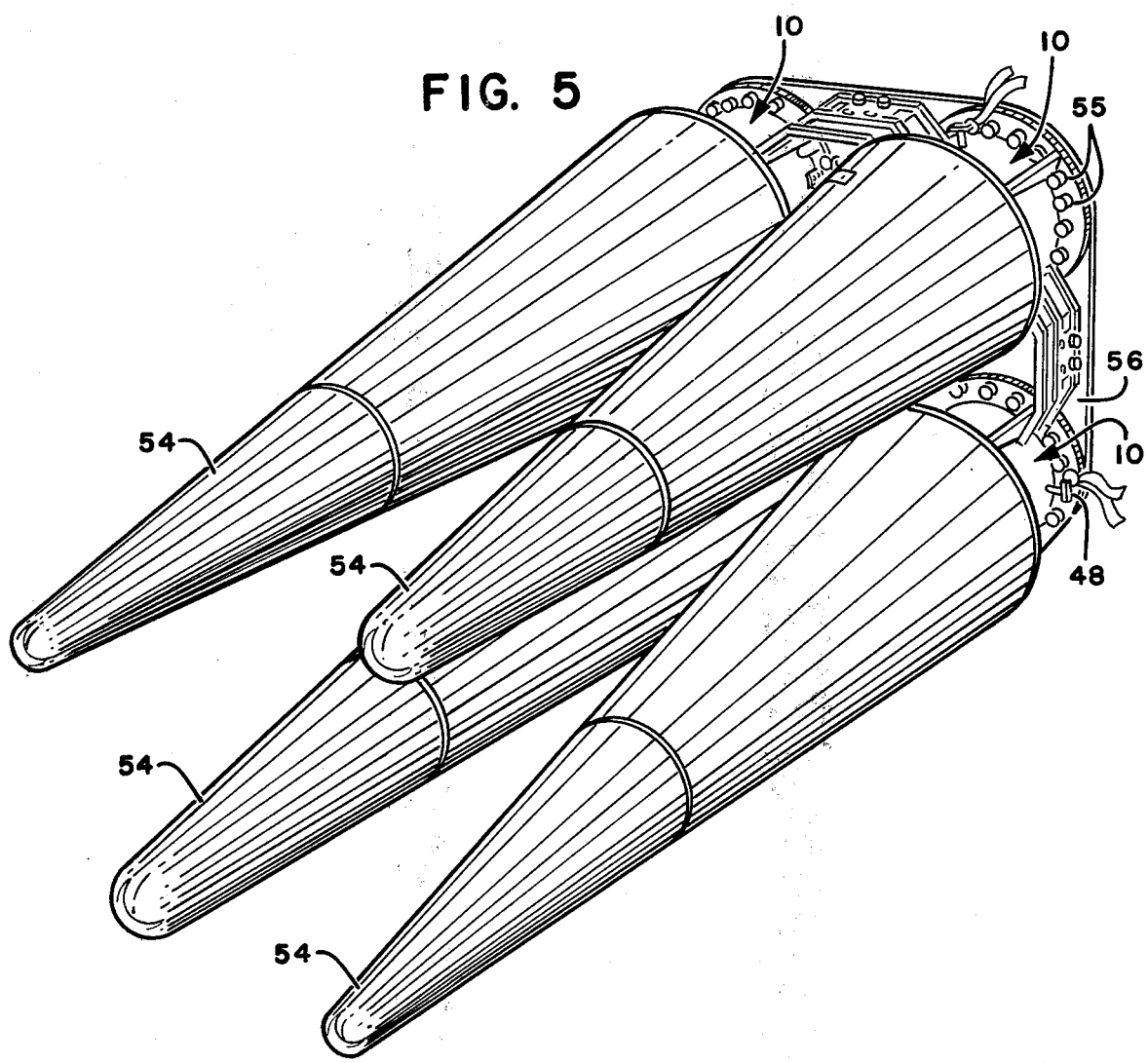

SPIN EJECTOR

FIELD OF THE INVENTION

The invention relates to spin ejectors and more particularly to spin ejectors for reentry and orbital vehicles.

BACKGROUND OF THE INVENTION

There is a need for spin launching single and plural space and/or reentry vehicles or bodies from an orbital or other extra-atmospheric body. It is highly desirable to be able to individually control launch speed and spin rate and provide preselected trajectories and ballistic stability for every launched vehicle.

Hence, there is a need for an apparatus capable of launching one or several bodies at individually selected spin rates and at independent trajectories. Typically, launched vehicles should have about the same spin rate for ballistic stability, but will be launched at different velocities to provide stable, independent and separate trajectories.

It is important that no "tip-off" error be introduced during a spin launch so that a closely spaced plurality of vehicles can be simultaneously or nearly simultaneously launched with minimum chance of collision.

Prior art devices typically used separate power sources such as springs, compressed cold gas, pyrotechnic hot gas and the like to provide rectilinear and spin motions. Such devices have induced tip-off error in vehicular trajectories caused by the relatively large clearance tolerance needed for essentially frictionless movement between parts. In addition, these devices were not adjustable, but were limited to fixed velocity and spin rates. Some of these devices induced rectilinear motion only and depended on spacecraft booster stages to induce necessary stabilizing angular velocity or spin.

SUMMARY OF THE INVENTION

In accordance with the present invention there is provided an apparatus for spin launching or ejecting a body comprising a base plate, a main ejection shaft extending perpendicularly from the base plate, a compressible spring disposed about the shaft, a bearing between the shaft and the spring, and a housing containing a helical slit releasably engaged with the base plate surrounding the shaft, bearing and spring. A piston guided by the shaft and the bearing is seated on the spring. The piston comprises an aperture follower fitted into and guided by the housing's aperture. The spring is compressed prior to launch and when released causes the piston to spin launch a vehicle releasably mounted thereon.

One object of the present invention is to provide spin ejection, essentially free of tip-off error, for a reentry vehicle from a launch body.

Another object of the instant invention is to provide, for a plurality of vehicles, substantially errorless independent launch trajectories from a launch body.

One advantage of the present invention is that in accordance therewith, prior to flight, rectilinear motion launch velocities providing preselected reentry separation for a plurality of vehicles can be individually selected.

Another advantage of the invention is that a spin launcher in accordance therewith provides an optimum angular velocity or spin rate for each vehicle to be launched, even though each such vehicle may be launched at a different rectilinear velocity.

Still another advantage of the present invention is that the same power source is used to provide both rectilinear and spin motions to a launched vehicle.

BRIEF DESCRIPTION OF THE DRAWINGS

Other objects and advantages in accordance with the present invention will be apparent to those skilled in the art from the following decription, with reference to the appended drawings, wherein like numbers denote like parts, and wherein:

FIG. 5 illustrates 4 spin ejectors in accordance with the invention as they may be used to mount ejection vehicles on a launch body.

DETAILED DESCRIPTION OF A PREFERRED EMBODIMENT OF THE INVENTION

Figure 1:
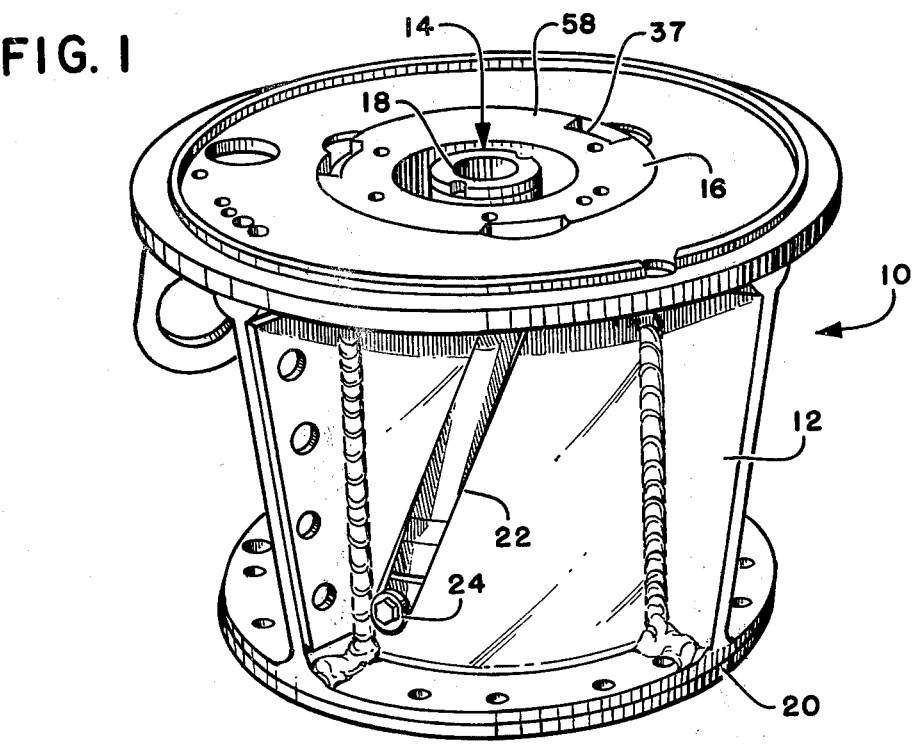
FIG. 1 is a perspective view of a preferred embodiment of a spin ejector of the invention in position to spin launch.
Figure 3:
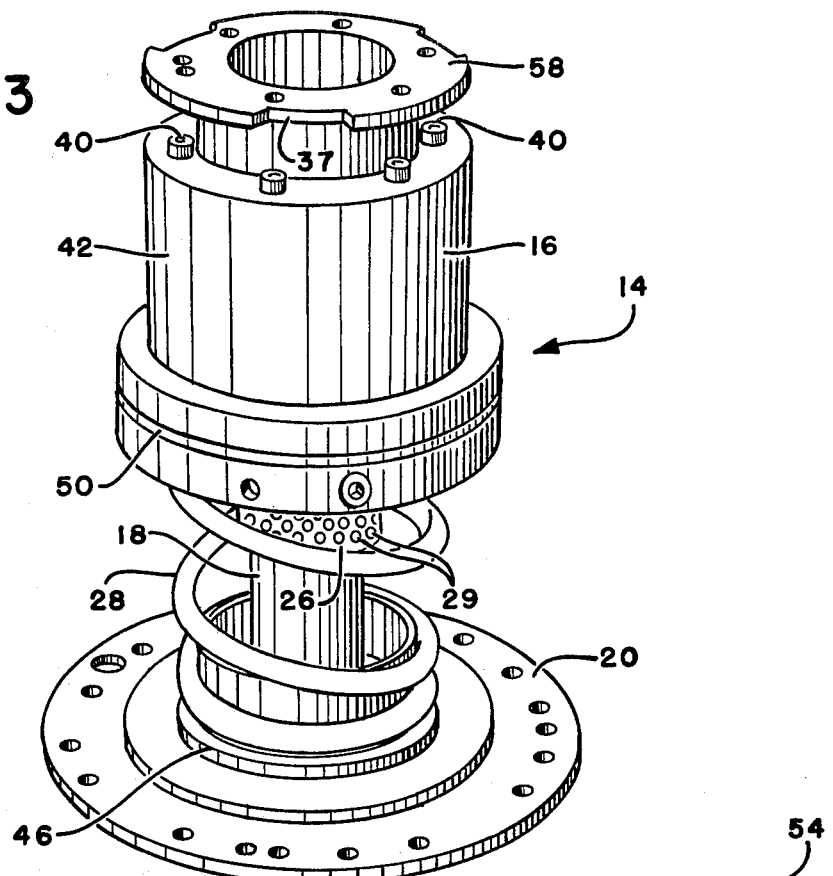
FIG. 3 is a perspective view of the power assembly of the ejector of FIGS. 1 and 2.

Reference is now made to FIG. 1 which illustrates a preferred embodiment of the invention. As shown therein, a spin ejector 10 comprises a housing 12 and a power assembly 14, the latter being best seen in FIG. 3. Power assembly 14 comprises a piston 16, a main ejection shaft 18 and a base plate 20. Housing 12 comprises at least one and preferably two helical cam slots 22 which accommodate ball bearing followers 24 attached to piston 16 as hereinafter described. Housing 12 and base plate 20 are adapted to fit together as shown and to be bolted or otherwise attached to the front base plate 56 of a launch vehicle as seen in FIG. 5 from which orbital or reentry vehicles may be launched by spin ejectors.

Figure 4:
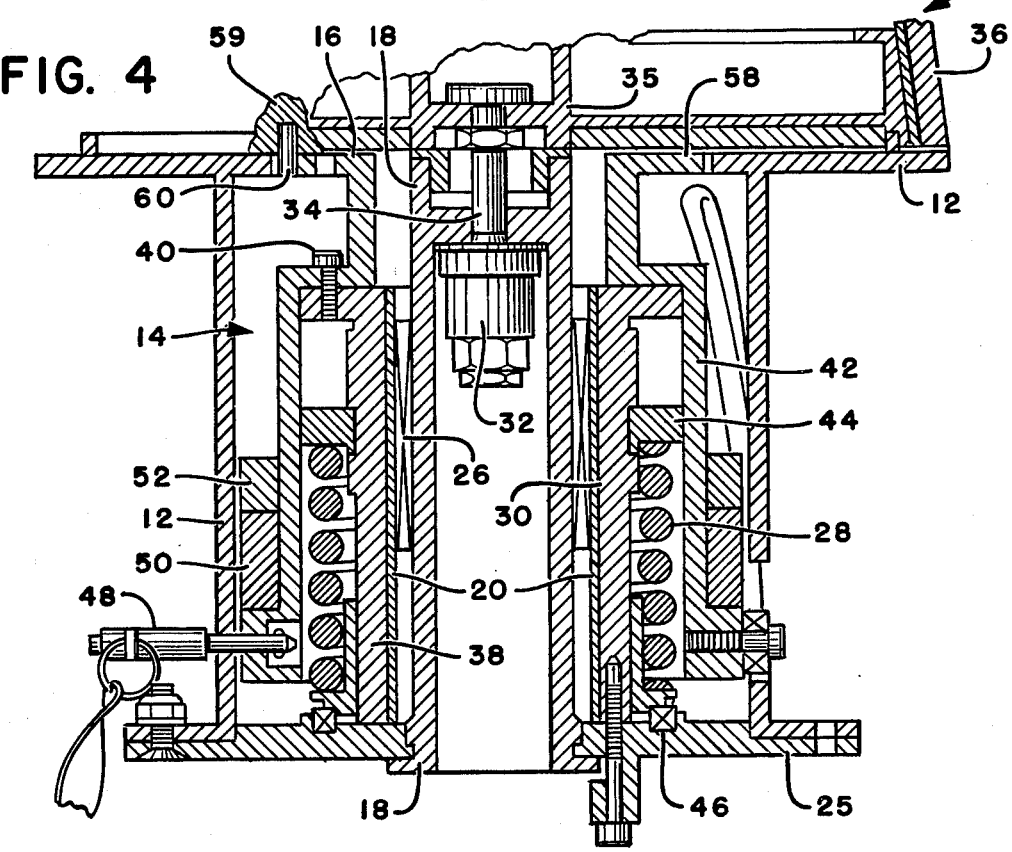
FIG. 4 is a cross-sectional view of the ejector in its FIG. 1 position.

Piston 16 frictionlessly engages ejection shaft 18 about a precision fit bearing 26. A spring 28 provides the sole source of power for spin ejecting a vehicle from the spin ejector. Bearing 26 precision fits by an elastic compression fit of balls 29 thereof between shaft 18 and the inner wall 25 of piston 16 as seen in FIG. 4. Thus, piston 16 has essentially no side play as it moves along shaft 18.

Figure 2:
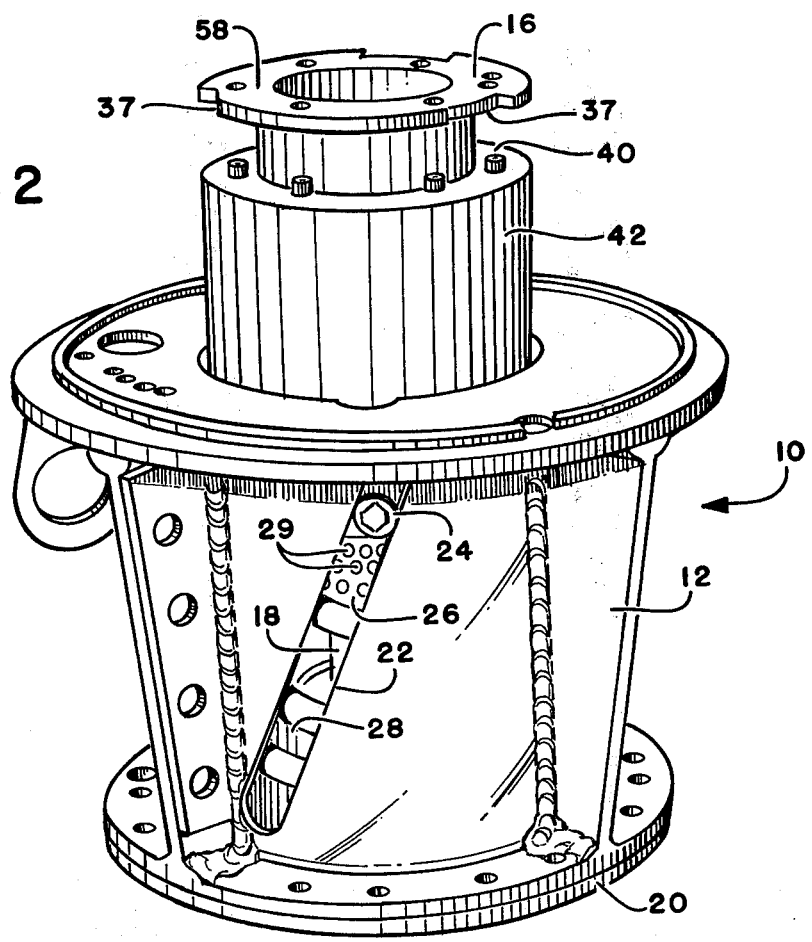
FIG. 2 is a perspective view of the preferred embodiment after a spin launch.

As can be seen in FIG. 2, upon release of the compressed spring 28, piston 16 achieves the extended position shown therein, ball bearing follower 24 having followed helical cam slot 22 from one end thereof to the other. Because of stresses such as side loads, it is generally desirable to preload the body to be ejected to the ejector to prevent any gap opening at the interface between the body and the ejector. In the preferred embodiment illustrated in FIG. 4, this is accomplished by torquing an ordnance operated release nut 32 to an appropriately threaded shaft 34 extending through a base 35 of a body to be ejected 36.

Piston 16 comprises a cylindrical inner portion 38 secured with bolts 40 to an outer portion 42. An adjustment nut 44 provides for fine adjustments to be made to spin and velocity by compression or relaxation of the preload in spring 28 compressed between adjustment nut 44 and a circular bearing 46 between spring 28 and base plate 20. Bearing 46 prevents high-friction drag between spring 28 and the base plate 20. Piston 16 is maintained in the spring compressed position during assembly and prior to attachment of the release nut 32 by ball-lock safety pins 48 which are removed before flight.

A spacer 50, seen in FIG. 4, can be added to shorten effective piston stroke and to enable a greater variation in adjustment of ejection velocity. A shock absorber 52 softens the piston on housing impact at the end of the piston's stroke.

Orbital or reentry vehicles or bodies 54 are seen in FIG. 5 attached to spin ejectors 10 which are affixed by bolts 55 to a face plate 56 on the fore end of a launching vehicle not shown for the sake of clarity.

The flat surface face 58 of piston 16 containing three pins 60 pushes against a plurality of bosses 59 machined in a corresponding flat plane on the aft end of the body to be launched. The launched vehicle or body is spin balanced so as to have a center of gravity position directly in line with the longitudinal axis of rotation of piston 16. Thus, the interface between piston 16 and the base 35 of the ejection body incorporate a one-way drive by the three pins 60, affixed to base 35. Recessed portions 37 in the periphery of the top of piston 16 allow the pins 60 to clear piston 16, thereby allowing the launched vehicle to continue its spinning flight without disturbance at the end of the piston stroke.

It will be appreciated by those skilled in the art that there will be umbilical electrical cables between the vehicles to be launched and the launching body and that they may be separated in any well known manner.

Different spring designs, helical cam slot angles, and spring rates will provide a selection of launch velocities and spin rates. Thus, each of the vehicles 54 may be launched at a different time and at different launch velocities and spin rates, if desired.

The various features and advantages of the invention are thought to be clear from the foregoing description. However, various other features and advantages not specifically enumerated will undoubtedly occur to those versed in the art, as likewise will many variations and modifications of the embodiments illustrated herein, all of which may be achieved without departing from the spirit and scope of the invention as defined by the appended claims.

We claim:

1. An apparatus for spin ejecting a body having a flat plane base containing bosses, said apparatus comprising:
   a base plate;
   a main ejection shaft extending perpendicularly from said base plate;
   a compressible cylindrical spring disposed about said shaft; bearing means comprising elastically compression fit balls between said shaft and said spring;
   a housing releasably engaged with said base plate surrounding said shaft, bearing means and spring, said housing containing a helical aperture;
   a piston having a flat surface containing guide pins insertable into said bosses of said body's base to provide a non-slip releasable drive coupling between said body and said piston, said piston being seated on said spring and guided by said shaft and bearing, said piston comprising an aperture follower fixed thereon and juxtaposed within said helical aperture to control the spin rate of said piston;
   means for compressing said spring; and
   means comprising an ordnance operated nut for releasing said compressed spring to cause said piston to spin eject.

2. The invention of claim 1 further comprising an annular bearing disposed between said base plate and said spring providing essentially frictionless rotation between said spring and said bearing.

3. The invention of claim 1 further comprising spacer means for adjusting spring extension and means for adjusting spring preload.

4. The invention of claim 3 further comprising means peripherally disposed about said piston for absorbing shock between said piston and said housing upon maximum allowed extension of said spring.

* * * * *